(12) United States Patent
Nguyen et al.

(10) Patent No.: US 10,546,698 B2
(45) Date of Patent: Jan. 28, 2020

(54) STRUCTURE FOR ELECTRIC ENERGY STORAGE USING CARBON NANOTUBES

(71) Applicant: ZAPGOCHARGER LTD., Oxfordshire (GB)

(72) Inventors: Cattien V. Nguyen, San Jose, CA (US); You Li, Sunnyvale, CA (US); Hoang Nguyen Ly, San Jose, CA (US); Darrell L. Niemann, Santa Clara, CA (US); Bevan Vo, Santa Clara, CA (US); Philip A. Kraus, San Jose, CA (US)

(73) Assignee: ZapGo Ltd, Oxfordshire (GB)

( * ) Notice: Subject to any disclaimer, the term of this patent is extended or adjusted under 35 U.S.C. 154(b) by 1205 days.

(21) Appl. No.: 14/459,268

(22) Filed: Aug. 13, 2014

(65) Prior Publication Data
US 2014/0349216 A1 Nov. 27, 2014

Related U.S. Application Data

(63) Continuation-in-part of application No. 14/208,989, filed on Mar. 13, 2014.

(60) Provisional application No. 61/798,953, filed on Mar. 15, 2013.

(51) Int. Cl.
| | | |
|---|---|---|
| *B32B 9/00* | (2006.01) | |
| *H01G 11/36* | (2013.01) | |
| *H01M 4/1393* | (2010.01) | |
| *H01M 4/04* | (2006.01) | |
| *H01M 4/133* | (2010.01) | |
| *H01M 4/90* | (2006.01) | |
| *H01G 11/46* | (2013.01) | |

(52) U.S. Cl.
CPC ............. *H01G 11/36* (2013.01); *H01G 11/46* (2013.01); *H01M 4/0404* (2013.01); *H01M 4/133* (2013.01); *H01M 4/1393* (2013.01); *H01M 4/9083* (2013.01)

(58) Field of Classification Search
CPC ........ C01B 31/04; B82Y 30/00; Y10T 428/30
USPC ........ 428/408; 423/448, 447.3; 252/500–503
See application file for complete search history.

(56) References Cited

U.S. PATENT DOCUMENTS

| | | |
|---|---|---|
| 6,454,816 B1 | 9/2002 | Lee et al. |
| 7,811,149 B2 | 10/2010 | Liu et al. |
| 8,226,808 B2 | 7/2012 | Kim et al. |
| 8,333,810 B1 | 12/2012 | Meyyappan |
| 2005/0212014 A1 | 9/2005 | Horibe et al. |

(Continued)

FOREIGN PATENT DOCUMENTS

| | | |
|---|---|---|
| JP | 2005129566 A | 5/2005 |

OTHER PUBLICATIONS

B. D. Hostermann, Raman Spectroscopic Study of Solid Solution Spinel Oxides, PhD Thesis, Univ. Nev., Las Vegas, 2011.

*Primary Examiner* — Daniel H Miller
(74) *Attorney, Agent, or Firm* — Hodgson Russ LLP

(57) ABSTRACT

A composite electrode structure and methods of making and using thereof are disclosed. The structure has a metal substrate with a metal oxide layer. The average thickness of the metal oxide layer is less than 150 nm, and comprises at least a first metal and a second metal, wherein the first metal and the second metal are different elements. A plurality of carbon nanotubes is disposed on a first surface of the metal oxide layer. At least a portion of the carbon nanotubes are disposed such that one end of the carbon nanotube is positioned at least 5 nm below the surface of the metal oxide layer.

21 Claims, 10 Drawing Sheets

(56) References Cited

U.S. PATENT DOCUMENTS

| | | |
|---|---|---|
| 2005/0238810 A1 | 10/2005 | Scaringe et al. |
| 2007/0258192 A1 | 11/2007 | Schindall et al. |
| 2008/0044651 A1 | 2/2008 | Douglas |
| 2008/0192407 A1 | 8/2008 | Lu et al. |
| 2008/0241755 A1* | 10/2008 | Franklin ............... B82Y 10/00 430/296 |
| 2009/0176164 A1* | 7/2009 | Matsui ................ H01G 9/038 429/342 |
| 2010/0028634 A1* | 2/2010 | Turevskaya ............ H01B 1/04 428/213 |
| 2010/0178564 A1 | 7/2010 | Asari et al. |
| 2010/0178568 A1 | 7/2010 | Unalan et al. |
| 2010/0233496 A1* | 9/2010 | Kim ..................... B82Y 10/00 428/469 |
| 2011/0157770 A1 | 6/2011 | Nguyen et al. |
| 2012/0040523 A1 | 2/2012 | Kondo |
| 2012/0058296 A1 | 3/2012 | Shah et al. |
| 2012/0132864 A1 | 5/2012 | Kar et al. |
| 2012/0320497 A1* | 12/2012 | Ehrenberg ............ H01G 11/32 361/525 |
| 2014/0104752 A1* | 4/2014 | Bendale ................ H01G 11/68 361/502 |

\* cited by examiner

STRUCTURE FOR ELECTRIC ENERGY STORAGE USING CARBON NANOTUBES

This application is a Continuation-in-Part of U.S. patent application Ser. No. 14/208,989, filed Mar. 13, 2014, which claims priority from U.S. Provisional Patent Application No. 61/798,953, filed Mar. 15, 2013, entitled "Carbon Nanotube Composite Structures." application Ser. Nos. 14/208,989 and 61/798,953 are incorporated herein by reference in their entireties for all purposes.

FIELD

This disclosure is directed to electrochemical energy storage systems (e.g., Li-ion secondary batteries), fuel cells, secondary batteries based on hydrogen storage and ultracapacitors that operate with carbon nanotube structures.

BACKGROUND

Energy storage devices, such as ultracapacitors (i.e., electrochemical capacitors, electrical double layer capacitors or supercapacitors) are increasingly important in powering a wide variety of devices such as, for example, motor vehicles, cellular telephones, computers, etc. and furthermore, may be used as a replacement for or in conjunction with conventional batteries. Ultracapacitors have a number of advantages compared to conventional batteries such as, for example, long life cycle, easy construction, short charging time, safety and high power density.

Conventional ultracapacitors include metal substrates (e.g., aluminum) on which are deposited active materials which have high surface area as the electrodes. Activated carbon is the most commonly used active material, which is typically deposited on metal substrates as a paste, which includes a binder and forms a thin film on the surface of the substrate.

Recently, carbon nanotubes have been used as active materials in electrodes to form ultracapacitors. Similarly to activated carbon, carbon nanotubes can be deposited as a paste, which includes a binder, on metal substrates. However, deposition of carbon nanotubes as a paste leads to increased high interface resistance because of the continuing presence of the binder and poor mechanical/electrical contact between carbon nanotubes and metal collectors, which leads to poor power performance of the capacitor. Alternatively, carbon nanotubes may be grown on metal substrates with co-deposition of a metal catalyst. However, the continuing presence of the catalyst leads to poor power performance of the capacitor.

More recently, chemical vapor deposition has been used to directly grow continuous films of both vertically aligned or randomly dispersed carbon nanotubes on thick, highly polished metal substrates. Such carbon nanotubes are useful electrodes for constructing an ultracapacitor but are costly, difficult to package and/or mold and have a reduced performance profile because substantial resistance develops between the carbon nanotubes and the metal surface upon deposition of charge.

SUMMARY

A composite structure for use as an electrode is disclosed. The structure comprises a metal substrate having a thickness less than 500 µm. A metal oxide layer is disposed over at least a majority of a first surface of the metal substrate. The average thickness of the metal oxide layer is less than 150 nm. The metal oxide layer comprises at least a first metal and a second metal, the first metal and the second metal being different elements. The structure also has a plurality of carbon nanotubes disposed on a first surface of the metal oxide layer. At least a portion of the carbon nanotubes are disposed such that one end of the carbon nanotube is positioned at least 5 nm below the surface of the metal oxide layer. In an embodiment the first metal and the second metal are each selected from a group consisting of: iron, nickel, aluminum, cobalt, copper, chromium, and gold.

In some embodiments, the first surface of the metal substrate has root mean square roughness of 200 nm or less.

In some embodiments, at least a first carbon nanotube is resistively coupled to the substrate. In some embodiments, an electrical junction between the first carbon nanotube and the substrate is ohmic. In some embodiments, an electrical junction between the first carbon nanotube and the substrate is non-ohmic. In some embodiments, the metal oxide layer has a resistivity of less than $1\times10^{14}$ Ω-m.

In some embodiments, the metal oxide layer has a first metal oxide comprising the first metal and a second metal oxide comprising the second metal, where the first metal is selected from a first group of metals consisting of: iron, nickel, aluminum, cobalt, copper, chromium, and gold. In some embodiments, the second metal is selected from the first group of metals. In some embodiments, the atomic ratio of the first metal to the second metal in the oxide layer is at least 6:5. In some embodiments, at least a portion of the metal oxide layer is characterized by a spinel phase and the Raman spectrum of the oxide shows a pronounced peak at about 680 $cm^{-1}$.

In some embodiments, the carbon nanotubes are disposed on the metal oxide such that at least 50% of the carbon nanotubes are orthogonal to the first surface of the metal oxide. In some embodiments, the carbon nanotubes are disposed on the metal oxide such that at least 50% of the carbon nanotubes are non-orthogonal to the first surface of the metal oxide.

In some embodiments, the ratio of carbon in the carbon nanotubes to the total amount of carbon in the total structure is at least 9:10.

A method of synthesizing a composite structure is disclosed. In some embodiments, the steps include: providing a metal substrate, the substrate having a thickness less than 500 µm; providing a metal oxide layer disposed over at least a majority of a first surface of the metal substrate, the metal oxide layer being comprised of at least a first metal and a second metal, the first metal being different from the second metal; and developing a plurality of carbon nanotubes disposed on the metal oxide layer and resistively coupled to the metal substrate. In some embodiments, the method may further comprise, in the step of providing carbon nanotubes, synthesizing the carbon nanotubes at least in part by a chemical vapor deposition process. In another step of the embodiment, at least a portion of the carbon that fails to form into the carbon nanotubes is removed, such that the ratio of carbon contained in the nanotubes to the total carbon in the structure is at least 9:10.

In some embodiments, the method of synthesizing a composite structure comprises providing a metal substrate, the substrate having a thickness less than 500 µm; forming a metal oxide layer over at least a majority of a first surface of the metal substrate, the metal oxide layer comprising at least a first metal and a second metal, wherein the first metal is different from the second metal; and forming a plurality of carbon nanotubes on the metal oxide layer using chemical vapor deposition, wherein the carbon nanotubes are resistively coupled to the metal substrate, and wherein at least a portion of the carbon nanotubes are disposed such that one end of the carbon nanotube is positioned at least 5 nm below the surface of the metal oxide layer.

In some embodiments, the metal oxide layer is formed by oxidizing a portion of the metal substrate. In some embodiments, the metal oxide layer is formed by heating the metal substrate to a temperature between 250° C. and 1200° C.; and concurrently with the heating, exposing the metal substrate to an oxidizing gas. In some embodiments, the metal oxide layer is formed by exposing the metal substrate to a solution-based oxidizing agent. In some embodiments, the metal oxide layer is formed by heating the metal substrate to a temperature between 20° C. and 1200° C.; and concurrently with the heating, exposing the metal substrate to a plasma.

In some embodiments, at least a portion of the carbon that fails to form into the carbon nanotubes is removed, such that the ratio of carbon contained in the nanotubes to the total carbon in the structure is at least 9:10. In some embodiments, the method further comprises, in the step of providing carbon nanotubes, synthesizing the carbon nanotubes at least in part by a chemical vapor deposition process. In another step of the embodiment, at least a portion of the carbon that fails to form into the carbon nanotubes is removed, such that the ratio of carbon contained in the nanotubes to the total carbon in the structure is at least 9:10.

In some embodiments, the composite structure comprises a substrate comprising a first metal and a second metal, the first metal and the second metal being different elements, and wherein the first metal and the second metal make up at least 50% of the metal in the metal layer; a metal oxide layer comprising the first metal and the second metal, the metal oxide layer having a thickness between 1 nm and 300 nm, wherein at least 80% of the first metal and 80% of the second metal exist in an oxidized form; wherein the thickness of the substrate is less than 500 µm, the ratio of the thickness of the metal layer to the metal oxide layer is greater than 100, and the ratio of the first metal to the second metal is between 1:1 and 10:1. A plurality of carbon nanotubes is disposed on the substrate. The metal oxide layer is disposed between the metal layer and the plurality of carbon nanotubes. At least one carbon nanotube is resistively coupled to the metal layer through the metal oxide layer. At least one carbon nanotube is disposed such that one end of the carbon nanotube is positioned at least 5 nm below the surface of the metal oxide layer. The first metal is selected from a first group consisting of: iron, nickel, aluminum, cobalt, copper, chromium, and gold; and the second metal is selected from the first group.

DETAILED DESCRIPTION

Figure 1:
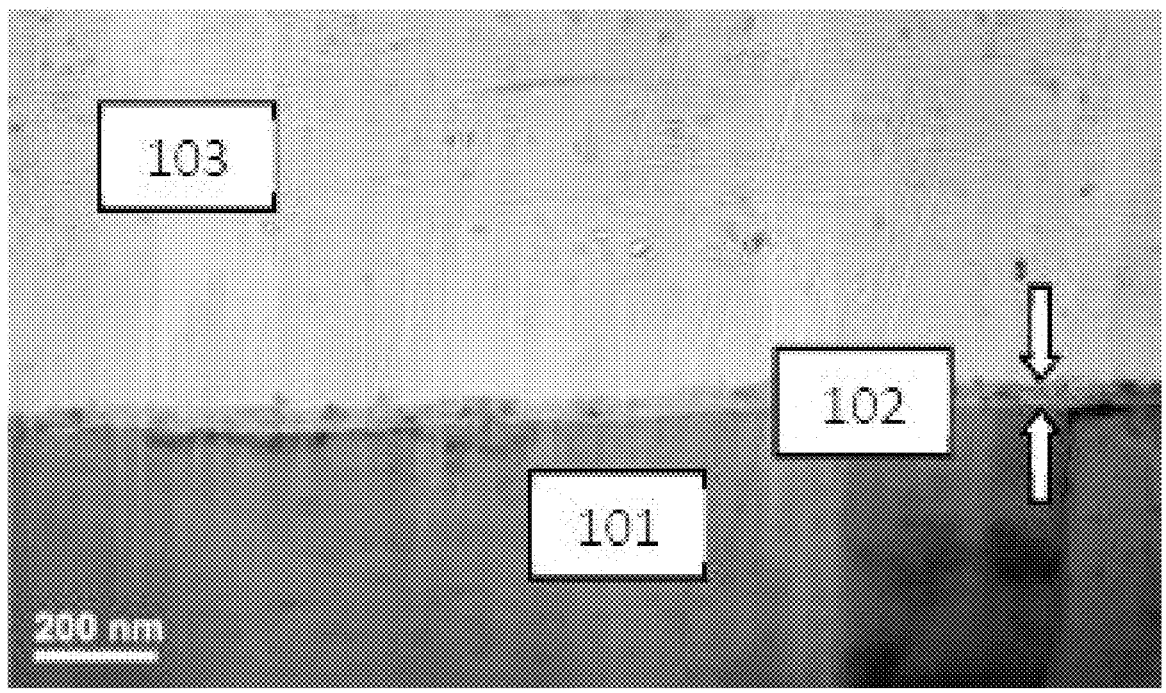
FIG. 1 shows a transmission electron micrograph (TEM) of carbon nanotubes attached to an oxide layer dispersed on a metal surface as visualized by transmission electron microscopy (TEM).

Unless defined otherwise, all technical and scientific terms used herein have the same meaning as is commonly understood by one of ordinary skill in the art to which this invention belongs. In the event that there is a plurality of definitions for a term herein, those in this section prevail unless stated otherwise.

It must be noted that as used herein and in the claims, the singular forms "a," "and" and "the" include plural referents unless the context clearly dictates otherwise. Thus, for example, reference to "a carbon nanotube" includes two or more carbon nanotubes, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Where the modifier "about" or "approximately" is used, the stated quantity can vary by up to 10%. Where the modifier "substantially equal to" is used, the two quantities may vary from each other by no more than 5%.

As used herein "carbon nanotube" or "CNT" refer to allotropes of carbon with a cylindrical structure. Carbon nanotubes may have defects such as inclusion of $C_5$ and/or $C_7$ ring structures such that the carbon nanotube is not straight and may have periodic coiled structures and/or random defected sites. CNTs can be single-walled or multi-walled. A CNT generally comprises one or more graphene sheets that are "rolled up" into a cylinder. A graphene sheet can be rolled up along any axis, and the properties can vary according to the specific axis along which the sheet is rolled up. CNTs typically have a diameter of a few nanometers and can be grown to lengths that are many times their diameter.

As used herein "ultracapacitors" include electrochemical capacitors, electrical double layer capacitors and supercapacitors.

As used herein "chemical vapor deposition" refers to plasma enhanced chemical vapor deposition or thermal chemical vapor deposition.

As used herein "plasma enhanced chemical vapor deposition" refers to the use of plasma (e.g., glow discharge) to transform a hydrocarbon gas mixture into excited species which deposit carbon nanotubes on a metal substrate.

As used herein "thermal chemical vapor deposition" refers to the thermal decomposition of hydrocarbon vapor in the presence of a catalyst which may be used to deposit carbon nanotubes on a metal substrate.

As used herein "physical vapor deposition" refers to vacuum deposition methods used to deposit thin films by condensation of a vapor of desired film material onto a substrate and includes techniques such as cathodic arc deposition, electron beam deposition, evaporative deposition, pulsed laser deposition and sputter deposition.

As used herein "nanopores" and "mesopores" refer to volumes that exist between and among an array of carbon nanotubes attached to a surface. The terms nanopore and mesopore are used by analogy to pores that can exist in catalytic structures and which increase the effective surface area of the catalyst as measured by surface-area measurement techniques. A "nanopore" refers to a volume having at least one characteristic dimension less than about 2 nm. A "mesopore" refers to a volume having at least one characteristic dimension between about 2 nm and about 50 nm.

In some aspects, a composite structure (e.g., a film stack) which includes a metal oxide layer disposed on a metal surface is provided. In some embodiments, the metal surface has a root mean square roughness of less than about 200 nm. In other embodiments, the metal surface includes any metal or any combination of metals. In other embodiments, the metal surface includes iron, nickel, aluminum, cobalt, copper, chromium, gold or combinations thereof. In still other embodiments, metal substrates are laminated on aluminum substrates.

In some aspects, composite structure which includes a metal oxide layer disposed on a metal substrate is provided. In some embodiments, the metal oxide layer includes any elements and combinations thereof that catalyze the growth of carbon nanotubes. In other embodiments, the metal substrate includes iron, nickel, aluminum, cobalt, copper, chromium, gold and combinations thereof.

In still other embodiments, the metal oxide layer includes oxides of iron, nickel, aluminum, cobalt, copper, chromium, gold or combinations thereof. In still other embodiments, the metal oxide layer includes a catalyst for the growth of carbon nanotubes. In still other embodiments, the metal oxide layer includes particles of iron, nickel, aluminum, cobalt, copper, chromium, gold and combinations thereof.

In some embodiments, the metal oxide layer is less than about 100 nm thick. In other embodiments, the metal oxide layer is between about 1 nm and about 100 nm thick. In still other embodiments, the metal oxide layer is between about 4 nm and about 50 nm thick. In still other embodiments, the metal oxide layer is between about 4 nm and about 20 nm thick. In still other embodiments, the metal oxide layer is between about 50 nm and about 75 nm thick.

In some embodiments, the metal substrate includes any metal or any combinations of metals. In other embodiments, the metal substrate includes iron, nickel, aluminum, cobalt, copper, chromium, gold and combinations thereof. In still other embodiments, the metal substrate comprises alloys of two or more of iron, nickel, cobalt, copper, chromium, aluminum, gold and combinations thereof. In still other embodiments, the alloy is a complete solid solution alloy. In still other embodiments, the alloy is a partial solid solution alloy. In still other embodiments, the alloy is a substitutional alloy. In still other embodiments, the alloy is an interstitial alloy.

In some embodiments, the metal substrate typically has a surface smoothness where the root mean square roughness is less than about 500 nm. In other embodiments, the root mean square roughness of the metal substrate is less than about 200 nm. In still other embodiments, the root mean square roughness of the metal substrate is between about 2 nm and about 200 nm. In still other embodiments, the root mean square roughness of the metal substrate is between about 5 nm and about 100 nm.

In some embodiments, the metal substrate is less than 500 μm thick. In other embodiments, the metal substrate is between about 10 μm and about 500 μm thick. In still other embodiments, the metal substrate is between about 10 μm and about 400 μm thick. In still other embodiments, the metal substrate is between about 10 μm and about 300 μm thick. In still other embodiments, the metal substrate is between about 10 μm and about 200 μm thick. In still other embodiments, the metal substrate is between about 10 μm and about 100 μm thick. In still other embodiments, the metal substrate is between about 10 μm and about 50 μm thick.

In some embodiments, the metal substrate is between about 1 μm and about 500 μm thick. In other embodiments, the metal substrate is between about 1 μm and about 400 μm thick. In still other embodiments, the metal substrate is between about 1 μm and about 300 μm thick. In still other embodiments, the metal substrate is between about 1 μm and about 200 μm thick. In still other embodiments, the metal substrate is between about 1 μm and about 100 μm thick. In still other embodiments, the metal substrate is between about 1 μm and about 50 μm thick.

In some embodiments, the metal substrate has a thickness of less than about than 500 μm and a root mean square roughness of less than about 200 nm. In other embodiments, the metal substrate has a thickness between about 10 μm and about 500 μm thick and a root mean square roughness between about 2 nm and about 200 nm.

It should be ascertainable that the ranges of the thickness of the metal oxide disclosed above may co-exist with any of the ranges of the thickness of the metal substrate. Accordingly the ratios of the metal substrate to the metal oxide layers may be based on any combinations of the metal substrate and the metal oxides.

In some embodiments, the metal substrate may be coated with a material that prevents attachment or formation of the metal oxide layer on the metal substrate (i.e., a protective coating). In other embodiments, the protective coating may partially cover either side of the metal substrate. In still other embodiments, the protective coating completely covers one side of the metal substrate and partially covers the other side of the metal substrate. In still other embodiments, the protective coating partially covers one side of the metal substrate. In still other embodiments, the protective coating completely covers one side of the metal substrate. In still other embodiments, neither side of the metal substrate is covered by a protective coating. In still other embodiments, the protective coating provides an area without carbon nanotubes for electrical tabs for device integration.

Generally, the metal substrate can have any convenient or useful width, length or geometric shape. In some embodiments, the metal substrate has a width greater than 1 mm. Generally, the width of the metal substrate may be any convenient width useful in a continuous roll-to-roll manufacturing process. In some embodiments, the metal substrate has a length greater than 1 mm. In other embodiments, the metal substrate has a length greater than 1 m. In still other embodiments, the metal substrate has a length greater than 10 m. In still other embodiments, the metal substrate has a length greater than 100 m. In still other embodiments, the metal substrate has a length greater than 1000 m.

In some embodiments, the metal substrate is less than about 500 μm thick and has a root mean square roughness of less than about 200 nm and the metal oxide layer is less than about 100 nm thick. In other embodiments, the metal substrate is between about 1 μm thick and about 500 μm thick and has a root mean square roughness of less than about 200 nm and the metal oxide layer is between about 1 nm thick and 100 nm thick. In still other embodiments, the metal substrate is between about 1 μm thick and about 300 μm thick and has a root mean square roughness of less than about 100 nm and the metal oxide layer is between about 1 nm thick and 75 nm thick. In still other embodiments, the metal substrate is between about 1 μm thick and about 200 μm thick and has a root mean square roughness of less than about 50 nm and the metal oxide layer is between 50 nm thick and about 1 μm thick. In still other embodiments, the metal substrate is between about 1 μm thick and about 100 μm thick and has a root mean square roughness of less than about 50 nm and the metal oxide layer is between about 1 nm thick and 50 nm thick.

In some embodiments, chemical vapor deposition is used to attach carbon nanotubes to a metal oxide layer disposed on a metal substrate in a continuous roll-to-roll manufacturing process. The only requirement for the above is that the length of the metal substrate is sufficient for use in a roll-to-roll manufacturing process. Generally, the width and length of the metal substrate may be any convenient dimension for use in a continuous roll-to-roll manufacturing process. In some embodiments, the length of the metal substrate is greater than 1 m. In other embodiments, the length of the metal substrate is greater than 10 m. In still other embodiments, the length of the metal substrate is greater than 100 m. In still other embodiments, the metal substrate has a length greater than 1000 m.

In some embodiments, chemical vapor deposition is used to form carbon nanotubes on a metal oxide layer disposed on a metal substrate in a batch manufacturing process, where one or more film stack substrates are processed simultaneously. The metal substrate may be precut into any geometric form such as a circle, square, rectangle, triangle, pentagon hexagon, etc or any other form that may be useful.

In some embodiments, chemical vapor deposition is used to attach carbon nanotubes to a metal oxide layer disposed on a metal substrate in a continuous in-line manufacturing process, where one or more metal substrate substrates are processed sequentially through a processing system with substrates moving linearly or radially through one or more linked processing environments. The metal substrate may be precut into any geometric form such as a circle, square, rectangle, triangle, pentagon hexagon, etc or any other form that may be useful.

In some embodiments, chemical vapor deposition is used to attach carbon nanotubes to a film stack including a metal oxide layer disposed on a metal substrate in a cluster-tool manufacturing process, where a substrate carrier comprising one or more metal substrates is processed sequentially in one or more linked processing systems in which a discrete processing step is carried out sequentially on the substrate carrier. The metal substrate may be precut into any geometric form such as a circle, square, rectangle, triangle, pentagon hexagon, etc or any other form that may be useful.

Figure 2:
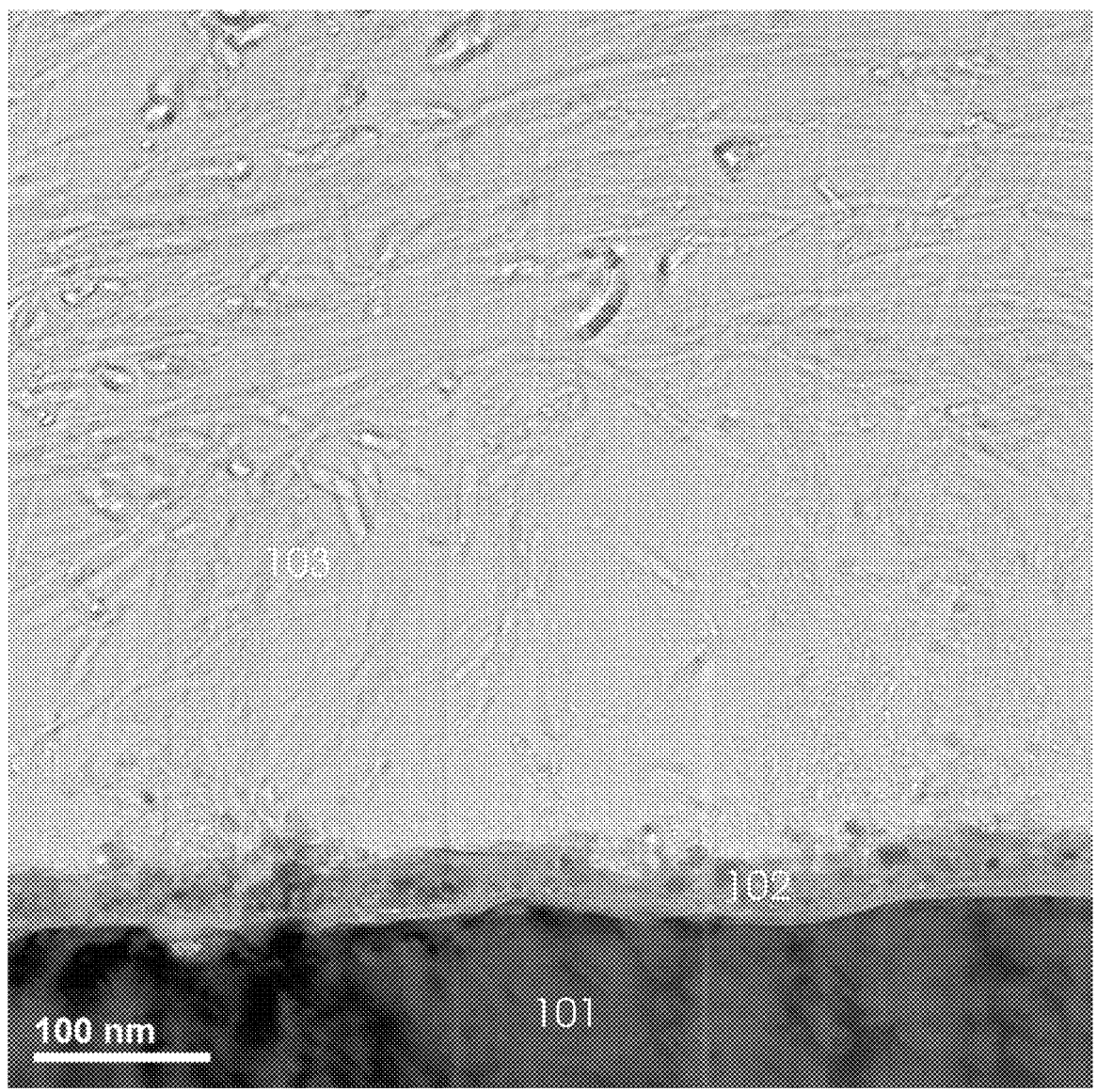
FIG. 2 shows a transmission electron micrograph (TEM) carbon nanotubes attached to an oxide layer dispersed on a metal surface at twice the resolution of FIG. 1.

Referring now to FIGS. 1 and 2, an electrode including carbon nanotubes 103 attached to metal oxide layer 102 disposed on metal substrate 101 is illustrated. Bars showing a reference scale of 200 nm and 100 nm respectively are also included. In FIGS. 1 and 2, the metal oxide layer 102 is contiguous and completely covers the metal substrate 101, so that carbon nanotubes 103 are disposed only on metal oxide layer 102.

Figure 3:
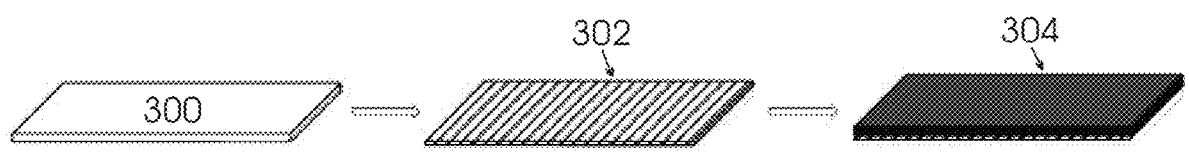
FIG. 3 shows processing of a metal surface to an electrode including carbon nanotubes attached to the layer of metal oxide disposed on the metal surface.

Referring now to FIG. 3, processing of a metal surface to an electrode including carbon nanotubes attached to a metal oxide layer disposed on a metal substrate is illustrated. Metal surface 300 is processed to form a metal oxide layer 302 on the metal surface by a variety of processes, supra. Then, carbon nanotubes 304 are formed on the metal oxide layer to provide an electrode including carbon nanotubes attached to a metal oxide layer disposed on a metal substrate.

Typical deposition of carbon nanotubes on Si substrates requires two sequential deposition steps, that of an oxide layer (such as $SiO_2$ or $Al_2O_3$) and then a metal catalyst layer on top of the oxide layer. The oxide layer prevents the diffusion of the metal catalyst layer into the Si substrate as well as improves adhesion of the carbon nanotubes to the Si substrates. The electrical contact between the carbon nanotubes and the Si substrate is poor in this case and the resulting devices have poor performance.

A number of methods exist for making a film stack which includes a metal oxide layer disposed on a metal surface. In some embodiments, the metal oxide layer can be deposited on the metal surface by conventional techniques, well known to those of skill in the art, such as physical vapor deposition and chemical vapor deposition.

In some embodiments, the metal surface may be oxidized by a variety of methods to provide a film stack which includes a metal oxide layer disposed on a metal surface. In some embodiments, the metal surface is oxidized with an oxidizing gas at an elevated temperature. In other embodiments, the oxidizing gas comprises water, oxygen, a nitrogen oxide, chlorine or fluorine. In still other embodiments, the elevated temperature is between about 300° C. and about 1100° C.

In some embodiments, the metal surface is chemically oxidized. In some embodiments, the metal surface is oxidized with an aqueous solution comprising an oxidizing agent. In other embodiments, the oxidizing agent is a peroxide, hydroperoxide, superoxide, permanganate, chlorate or perchlorate.

In some embodiments, the metal surface is oxidized with plasma. In other embodiments, the plasma is formed from water, oxygen, a nitrogen oxide, chlorine or fluorine at an elevated temperature. In still other embodiments, the elevated temperature is between about 25° C. and about 1100° C.

Figure 4:
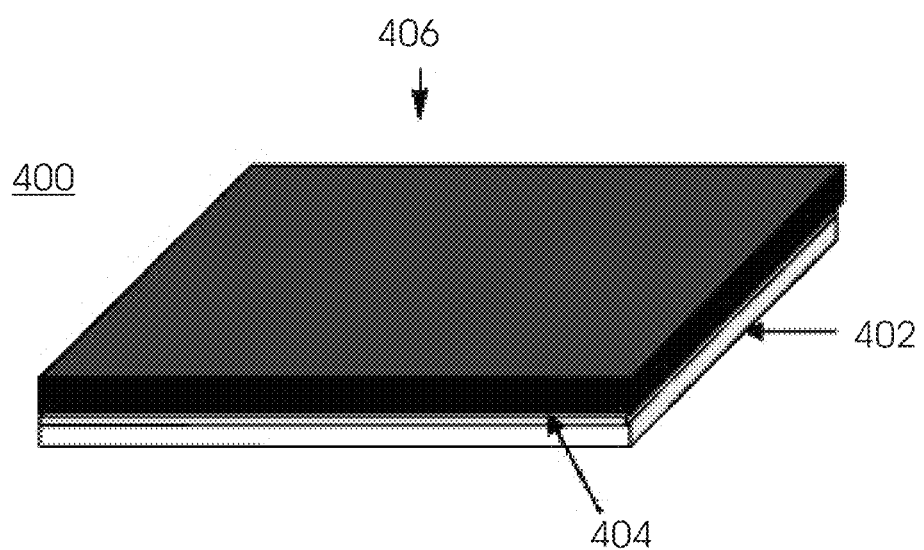
FIG. 4 shows one sided carbon nanotube deposition where carbon nanotubes are attached to a layer of metal oxide disposed on one side of a metal surface.
Figure 5:
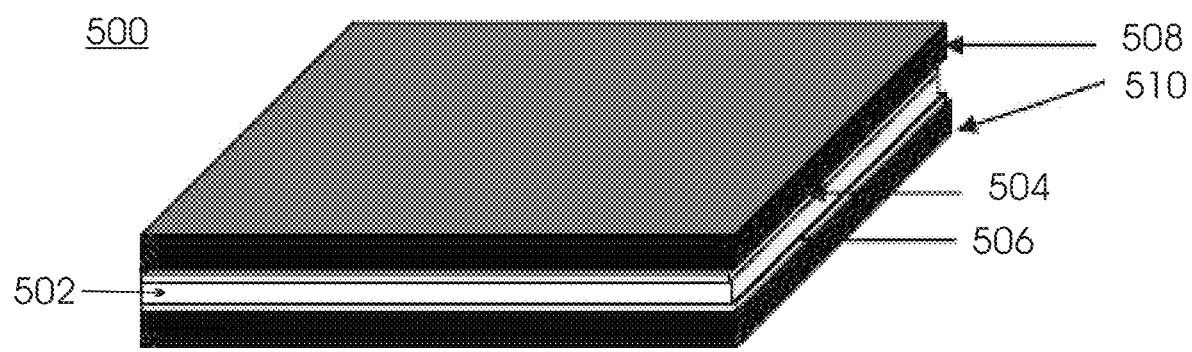
FIG. 5 shows two-sided carbon nanotube deposition where carbon nanotubes are attached to layers of metal oxide disposed on two sides of a metal surface.

Referring now to FIG. 4, carbon nanotubes 406 are formed on metal oxide layer 404 disposed on metal surface 402 to provide a one-sided carbon nanotube deposition 400. Referring now to FIG. 5, carbon nanotubes 508 and 510 are attached to metal oxide layers 504 and 506 disposed on metal surface 502 to provide a two-sided carbon nanotube deposition 500.

Figure 6:
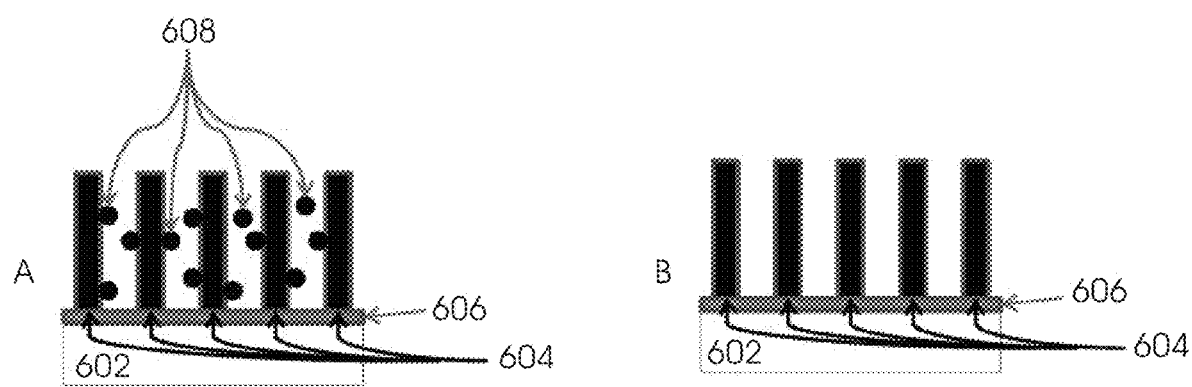
FIG. 6A shows CNTs with amorphous carbon also present.
FIG. 6B shows the CNTs of FIG. 6A with the amorphous carbon removed.

Referring now to FIG. 6B carbon nanotubes 604 are formed on metal oxide layer 606 disposed on metal surface 602 to form an electrode. The carbon nanotubes are highly porous, have a large surface area and high percentage of accessible nanopores and mesopores. Carbon nanotubes are chemically inert and electrically conductive. Carbon nanotubes may be single-walled or multi-walled or combinations thereof. Carbon nanotubes useful in the electrodes described herein include other forms such as toruses, nanobuds and graphenated carbon nanotubes. In some embodiments, the carbon nanotubes are vertically aligned. In other embodiments, the carbon nanotubes are in a vertical tower structure (e.g., perpendicular to the metal substrate). Other carbon nanotube configurations include, for example, horizontal or random alignment. In some embodiments, the carbon nanotubes are a random network with a minimal degree of alignment in the vertical direction.

In one embodiment a proportion of the carbon nanotubes are in a relationship to the growth surface of the metal substrate, the relationship being characterized as "orthogonal." In the spatial relationship between the carbon nanotubes and the surface of the metal oxide that the carbon nanotubes are disposed, each carbon nanotube can be thought of as having an "orientation" relative to the surface. Considering a single nanotube, the nanotube has a "beginning" edge and an "ending" edge. The nanotube, between the beginning edge and the ending edge has an instantaneous longitudinal axis for every portion of the nanotube. The average orientation of any carbon nanotube can be thought of as the average of all orientations of the longitudinal axis of that carbon nanotube along its length. A reference orientation is provided by the normal to the surface of the metal oxide on which the carbon nanotubes are disposed. A single carbon nanotube is defined, for the purposes of this application, to be "orthogonal" to the surface when the average orientation of the carbon nanotube is less than 45° from the reference orientation. Any other orientation of a carbon nanotube is defined as being "non-orthogonal."

In some embodiments, carbon nanotubes 604 are formed on metal oxide layer 606 by chemical vapor deposition processes. In other embodiments, carbon nanotubes are formed on a metal oxide layer disposed on a metal substrate by thermal chemical vapor deposition. In still other embodiments, carbon nanotubes are formed on metal oxide layer disposed on a metal substrate by plasma chemical vapor deposition.

Thermal chemical vapor deposition of carbon nanotubes is usually performed with hydrocarbon sources (e.g., methane, ethylene, acetylene, camphor, naphthalene, ferrocene, benzene, xylene, ethanol, methanol, cyclohexane, fullerene, etc.), carbon monoxide, or carbon dioxide at temperatures between about 600° C. and 1200° C. preferably, in the absence of oxygen or reduced amounts of oxygen.

Plasma enhanced chemical vapor deposition of carbon nanotubes is also usually performed with hydrocarbon sources, supra. Here, electrical energy rather than thermal energy is used to activate the hydrocarbon to form carbon nanotubes on metal substrates at preferred temperatures between about 300° C. and greater than 600° C. In some embodiments, carbon nanotubes are grown directly on the metal oxide layer without deposition of either metal catalyst or use of binders.

In some embodiments, a carbon nanotube is attached to (i.e., as the carbon nanotubes are formed, they grow from) the surface of the metal oxide layer. In some embodiments, one end of a carbon nanotube is buried below the surface of the metal oxide layer (i.e., grows from within the metal oxide layer) as shown in the TEM in FIG. 7. In some embodiments, a plurality of carbon nanotubes are attached to the metal oxide layer such that one end of each carbon nanotube is attached to the metal oxide layer at a distance from the surface of the metal oxide layer that can vary from zero to about 50 nm below the surface.

Figure 7:
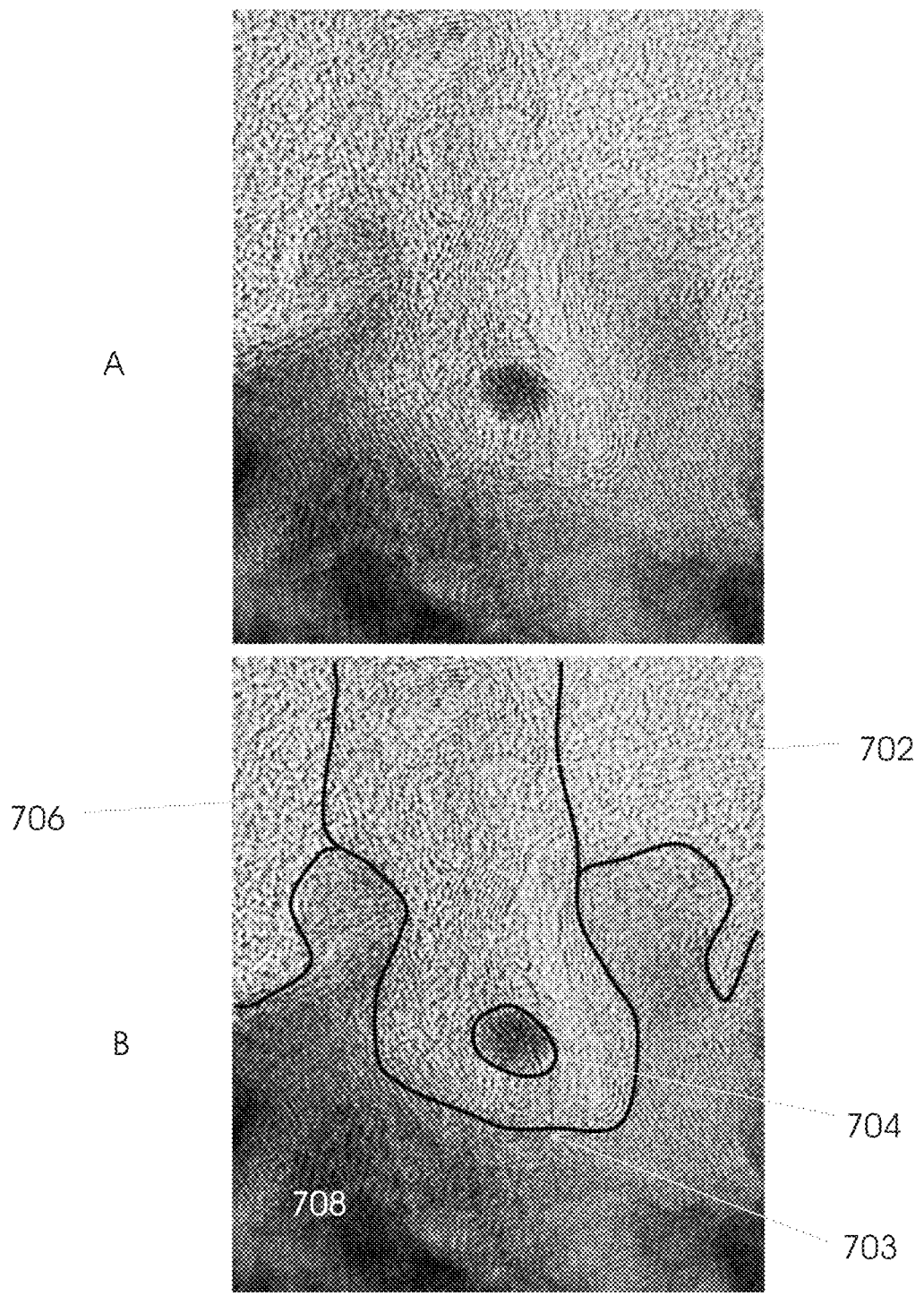
FIG. 7 shows a TEM of a carbon nanotube grown from within a metal oxide layer.

FIG. 7A shows the TEM as imaged; FIG. 7B has key regions of the same image delineated by black lines. There is inherently low contrast between the CNT and the surrounding epoxy used for sample preparation. Darker areas in FIG. 7 contain metal. FIG. 7 shows a TEM of a cross section of a film stack prepared according to methods described herein. A single multi-walled carbon nanotube 702 approximately 15 nm in diameter is shown with one end 703 about 10 nm below the surface of the metal oxide layer 708. A metal seed crystal 704 can be seen embedded in the buried end of the carbon nanotube. Region 706 comprises epoxy used to prepare the sample for TEM imaging.

Without being bound by theory, it is suggested that the metal oxide layer can comprise seed crystals comprising one of the metals forming the metal oxide layer. These seed crystals may form naturally during the formation of the metal oxide layer, or they may be selectively formed by a chemical reduction process (e.g., exposure to an $H_2$ plasma) after the metal oxide layer is formed and before the carbon nanotubes are formed. The seed crystals can comprise either the first metal or both the first and second metals in the metal oxide layer, where the first metal and the second metal are each selected from a group consisting of: iron, nickel, aluminum, cobalt, copper, chromium, and gold.

In contrast, other common processes for the formation of carbon nanotube arrays on a surface involve separately depositing an array of seed crystals on a surface (for example, by sputtering or from aqueous solution) prior to the formation of a carbon nanotube array. In embodiments of the instant methods, seed crystals are formed in a metal oxide layer (instead of being deposited on the surface of a metal oxide layer), and may exist at or below the surface of the metal oxide layer. A polycrystalline metal oxide layer may have grain boundaries that can be penetrated by a reducing agent (e.g., by exposure to an $H_2$ plasma) to allow formation of below-surface seed crystals by chemical reduction.

Carbon nanotubes generally comprise a cylinder or a set of concentric cylinders, wherein each cylinder comprises a single layer of carbon atoms arranged in a graphene structure (interconnected hexagonal rings). As such, once formed, they can grow only along the length of the tube and cannot increase in diameter. The growth can occur by adding additional atoms at one or both ends of the tube. Tubes of arbitrary length can, in principle, be grown. Typical carbon nanotube diameters are between 0.5 nm and 40 nm, and typical carbon nanotube lengths are between a few microns and hundreds of microns.

Without being bound by theory, it is suggested that carbon nanotubes grown from seed crystals on or below a metal oxide surface can grow by adding additional carbon atoms at the seed crystal (the "proximal" end of the nanotube), at the distal end of the growing nanotube, or both. If growth occurs at the proximal end, the remaining portion of the nanotube can be pushed away from the proximal end by the added carbon atoms. As noted above, seed crystals can be distributed through the volume of the metal oxide layer, and carbon nanotubes can be grown on seed crystals located anywhere in the metal oxide layer as long as carbon nanotubes are able to form from that site.

In some embodiments the proximal end of at least a portion of the carbon nanotubes is located within the oxide layer and at least 5 nm below the surface of the metal oxide layer. In some embodiments the proximal end of at least a portion of the carbon nanotubes is located at least 10 nm below the surface of the metal oxide layer. In some embodiments the proximal end of at least a portion of the carbon nanotubes is located at least 15 nm below the surface of the metal oxide layer. In some embodiments the proximal end of at least a portion of the carbon nanotubes is located at least 20 nm below the surface of the metal oxide layer. In some embodiments the proximal end of at least a portion of the carbon nanotubes is located at least 1 nanotube diameter below the surface of the metal oxide layer. In some embodiments the proximal end of at least a portion of the carbon nanotubes is located at least 1.5 nanotube diameters below the surface of the metal oxide layer. In some embodiments the proximal end of at least a portion of the carbon nanotubes is located at least 2 nanotube diameters below the surface of the metal oxide layer.

In some embodiments, a portion of the metal oxide layer disposed on a metal surface is pretreated to prevent attachment of carbon nanotubes to that portion of the layer. In other embodiments, a portion of the metal oxide layer disposed on a metal surface is pretreated with a film such as a metal film or an organic (polymer) film that prevents the direct growth of carbon nanotubes in these areas. Films such as those described above can be deposited, for example, by metal evaporation methods (such as thermal or e-beam evaporation) or by ink jet printing to give a desired pattern. Protective films may also be patterned by using a hard mask and/or photolithography techniques.

In some embodiments, a portion of the metal surface is pretreated to prevent oxide formation on that portion of the metal surface. In other embodiments, a portion of the metal surface is pretreated with a film such as a metal film or an organic (polymer) film that prevents the formation of the oxide layer on these areas. Films to prevent oxide formation can be deposited, for example, by metal evaporation methods (e.g., thermal or e-beam evaporation) or by ink jet printing to give a desired pattern. Protective films may also be patterned by using a hard mask and/or photolithography techniques.

In some embodiments, plasma treatment (e.g., $O_2$, $N_2$, $F_2$, $NH_3$) of carbon nanotubes surfaces can be used to increase surface wettability by increasing the hydrophilicity of the surface. Such treatment enables ions from electrolytes to access the pores of the carbon nanotubes which increase charge density.

Referring to FIG. 6A, during attachment of carbon nanotubes 604 to metal oxide layer 606 disposed on metal surface 602, a side product is amorphous carbon 608. Amorphous carbon reduces the porosity of carbon nanotubes, thus decreasing electrode performance. In some embodiments, selection of hydrocarbon precursors and control of temperature reduces the amount of amorphous carbon formed. Amorphous carbon may be removed by a number of methods including, for example, thermal or plasma cleaning with $O_2$ and exposure to strong acid, halogens and strong oxidants (e.g., $H_2O_2$). In some embodiments, vapor which includes water or $H_2O_2$ or combinations thereof may be used to remove amorphous carbon as described by Deziel et al., U.S. Pat. No. 6,972,056. FIG. 6B shows an array of carbon nanotubes with the amorphous carbon removed.

In some embodiments, a continuous water treatment process is used to remove impurities such as amorphous carbon from carbon nanotubes. The process includes a wet inert carrier gas stream (e.g., water vapor in argon or nitrogen) and may include an additional dry carrier gas stream which is added to adjust water concentration. Water is added using any water infusion method (e.g., bubbler, membrane transfer system, etc.). In some embodiments, water vapor is introduced into a process chamber maintained at between 600° C. and 1200° C. to remove amorphous carbon and other impurities associated with carbon nanotubes attached to a metal oxide layer disposed on a metal substrate.

In some embodiments, amorphous carbon is removed in a discrete step after deposition of carbon nanotubes on a metal oxide layer disposed on a metal substrate. In other embodiments, amorphous carbon is removed simultaneously during chemical vapor deposition. In still other embodiments, amorphous carbon is removed simultaneously during chemical vapor deposition and also in a discrete second step.

In an embodiment at least one carbon nanotube disposed on the surface is resistively coupled to the metal layer through the metal oxide layer. In one embodiment the coupling is ohmic in nature. For purposes of this disclosure, "ohmic" means that the voltage drop is varies linearly with the current through the metal oxide layer. In an embodiment, and for certain metal oxide layers, the current that passes from the carbon nanotubes to the metal layer may be other than ohmic, which could include such non-ohmic currents as, without limitation, p-n junction currents, tunnel junction currents, Schottky barrier currents, tunnel junction currents, rectifying heterojunction currents, breakdown junction currents, and hopping conductivity currents, to name a few.

Figure 8:
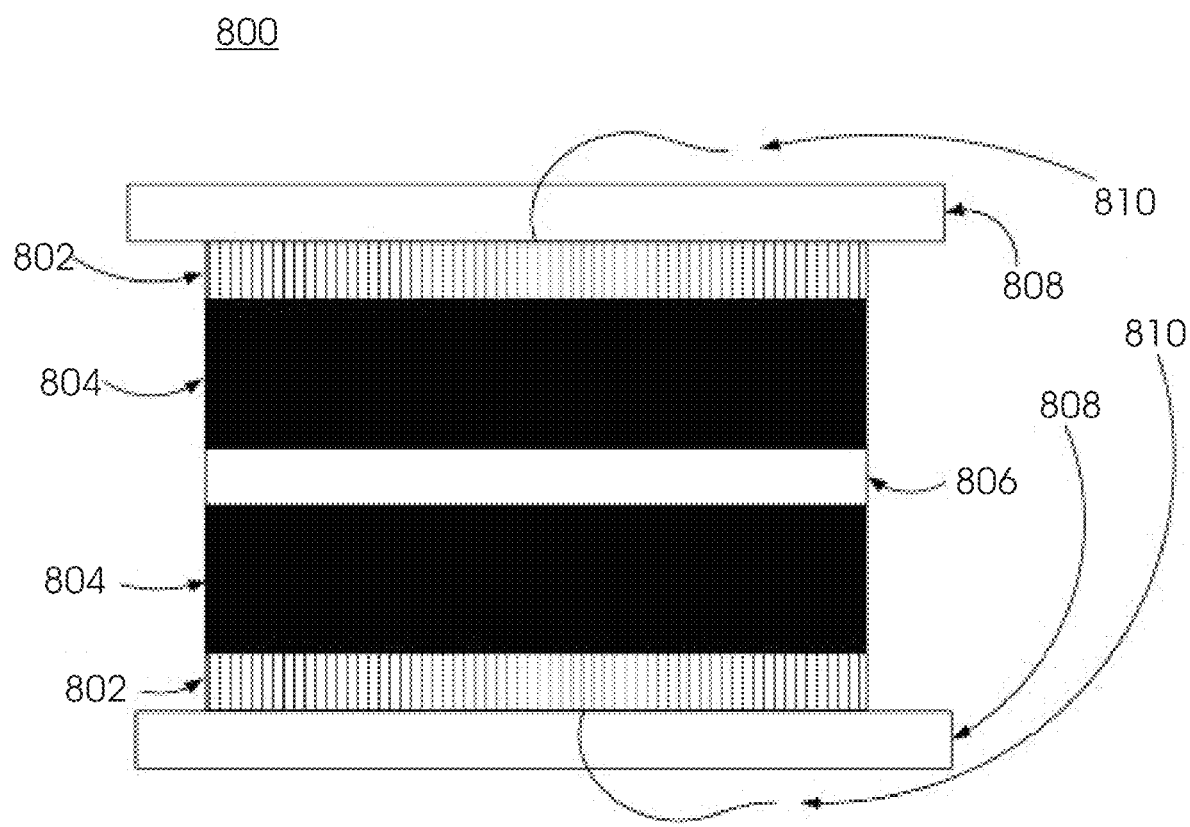
FIG. 8 shows an exemplary ultracapacitor.

FIG. 8 shows an exemplary ultracapacitor 800, which may be an electrochemical double layer capacitor with an operating voltage of greater than 0.05 V. Ultracapacitor 800 has two carbon nanotube electrodes 804 separated by an electrolytic membrane 806. In some embodiments, carbon nanotube electrodes 804 may be manufactured in any continuous manufacturing process including roll to roll fashion. In some embodiments, carbon nanotube electrodes 804 may be made with or without removal of amorphous carbon and attached to metal substrate which may include catalysts or binders or may not.

Electrical leads 810 (e.g., thin metal wires) contact collectors 802 (e.g., metal substrates 802) to make electrical contact. Ultracapacitor 800 comprises an electrolyte solution and leads 810 are fed out of the solution to facilitate capacitor operation. Clamp assembly 808 (e.g., coin cell enclosure, laminated cell enclosure, or adhesive tape) holds carbon nanotubes 804 attached to metal substrate 802 in close proximity while membrane 806 maintains electrode separation (i.e., electrical isolation) and minimizes the volume of ultracapacitor 800.

In some embodiments, ultracapacitor 800 consists of two vertically aligned multi-walled carbon nanotube electrodes 804 attached to metal substrate 802 and an electrolytic membrane 806 (e.g., CELGARD® or polypropylene) which are immersed in a conventional aqueous electrolyte (e.g., 45% sulfuric acid or KOH). In other embodiments, ultracapacitor 800 consists of two vertically aligned single-walled carbon nanotube electrodes 804 attached to metal substrate 802 and an electrolytic membrane 806 (e.g., CELGARD or polypropylene) which are immersed in a conventional aqueous electrolyte (e.g., 45% sulfuric acid or KOH).

In some embodiments, the ultracapacitor is a pseudocapacitor. In some of these embodiments, carbon nanotubes are loaded with oxide particles (e.g., $RuO_2$, $MnO_2$, $Fe_3O_4$, $NiO_2$, $MgO_2$, etc.). In other of these embodiments, carbon nanotubes are coated with electrically conducting polymers (e.g., polypyrrole, polyaniline, polythiophene, etc.). In some embodiments the ultracapacitor is an asymmetrical capacitor (i.e., one electrode is different than the other electrode in the capacitor).

In some embodiments, the ultracapacitors described herein can be stacked to form multiple pairs of electrodes. In other embodiments, the ultracapacitors described herein may be used to form stacked sheets of electrodes.

Figure 9:
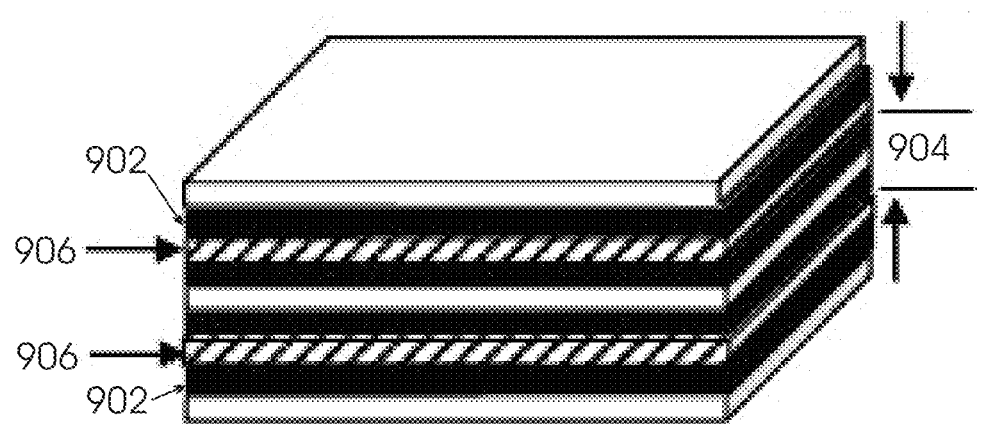
FIG. 9 shows an example of a device composed of 2 CNT electrodes.

Referring now to FIG. 9, an exemplary three electrode layer device is illustrated. The device has two one-sided electrodes 902 on the top and bottom with a two side electrode 904 sandwiched in the middle. Two electrolytic membranes 906 are disposed between the electrodes.

Figure 10:
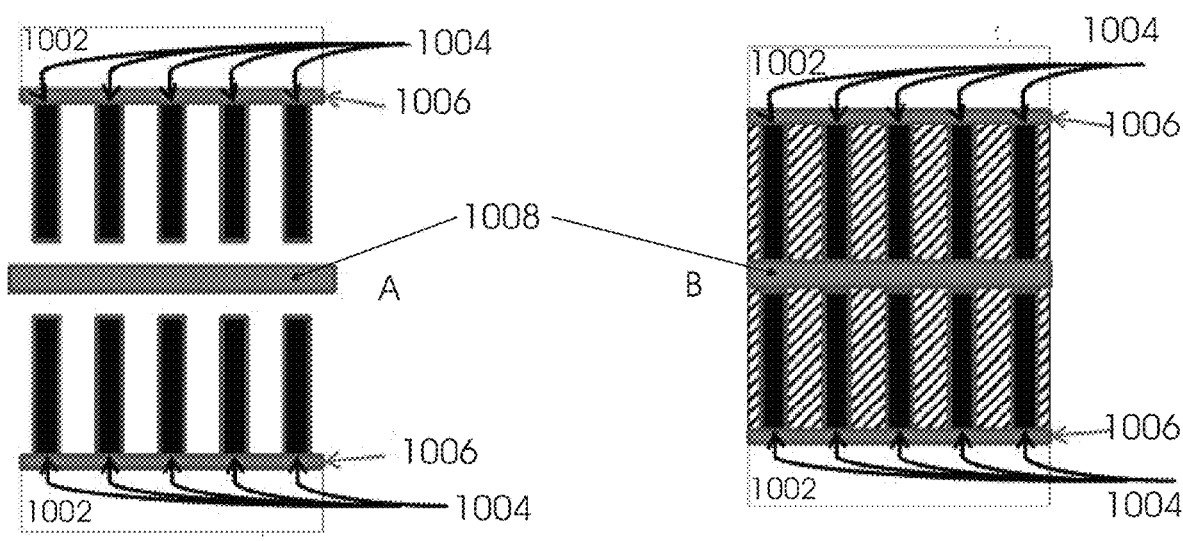
FIG. 10 shows carbon nanotubes attached to a metal oxide layer disposed on a metal surface. The carbon nanotubes are further coupled to a membrane and submerged in an electrolyte solution.

Referring now to FIG. 10A, electrodes include carbon nanotubes 1004 attached to metal oxide layers 1006 disposed on metal surface 1002 prepared as described, supra. An electrolytic membrane 1008 is provided to separate the electrolyte in contact with each electrode. Electrolytic membrane 1008 is a porous separator such as, for example, polypropylene, NAFION®, CELGARD, CELGARD 3400 glass fibers, or cellulose. The electrodes, which include carbon nanotubes 1004 attached to metal oxide layers 1006 disposed on metal surface 1002 are coupled to electrolytic membrane 1008 by a clamp assembly.

Referring now to FIG. 10B, carbon nanotubes 1004 attached to metal oxide layer 1006 disposed on metal surface 1002 and coupled to electrolytic membrane 1008 are immersed in electrolyte (shaded portion of figure) which may be a liquid or gel. In some embodiments, carbon nanotubes 1004 may be suffused with a gas or combinations thereof including air. Alternatively, in some embodiments the space around carbon nanotubes 1004 may be evacuated by a vacuum source. In some embodiments, electrolytes include, for example, aqueous electrolytes (e.g., sodium sulfate, magnesium sulfate, potassium chloride, sulfuric acid, magnesium chloride, etc.), organic solvents (e.g., acetonitrile, propylene carbonate, tetrahydrofuran, gamma butyrolactone, etc.), ionic liquids (e.g., 1-ethyl-3-methylimidazolium bis(pentafluoroethylsulfonyl)imide, etc.), electrolyte salts soluble in organic solvents, (tetralkylammonium salts (e.g., $(C_2H_5)_4NBF_4$, $(C_2H_5)_3CH_3NBF_4$, $(C_4H_9)_4NBF_4$, $(C_2H_5)_4NPF_6$, etc.) tetralkylphosphonium salts (e.g., $(C_2H_5)_4$ $PBF_4$, $(C_3H_7)_4PBF_4$, $(C_4H_9)_4PBF_4$, etc.), lithium salts (e.g., $LiBF_4$, $LiPF_6$, $LiCF_3SO_3$, etc., N-alkyl-pyridinium salts, 1,3 bisalkyl imidazolium salts, etc.), etc.

EXAMPLE

Figure 11:
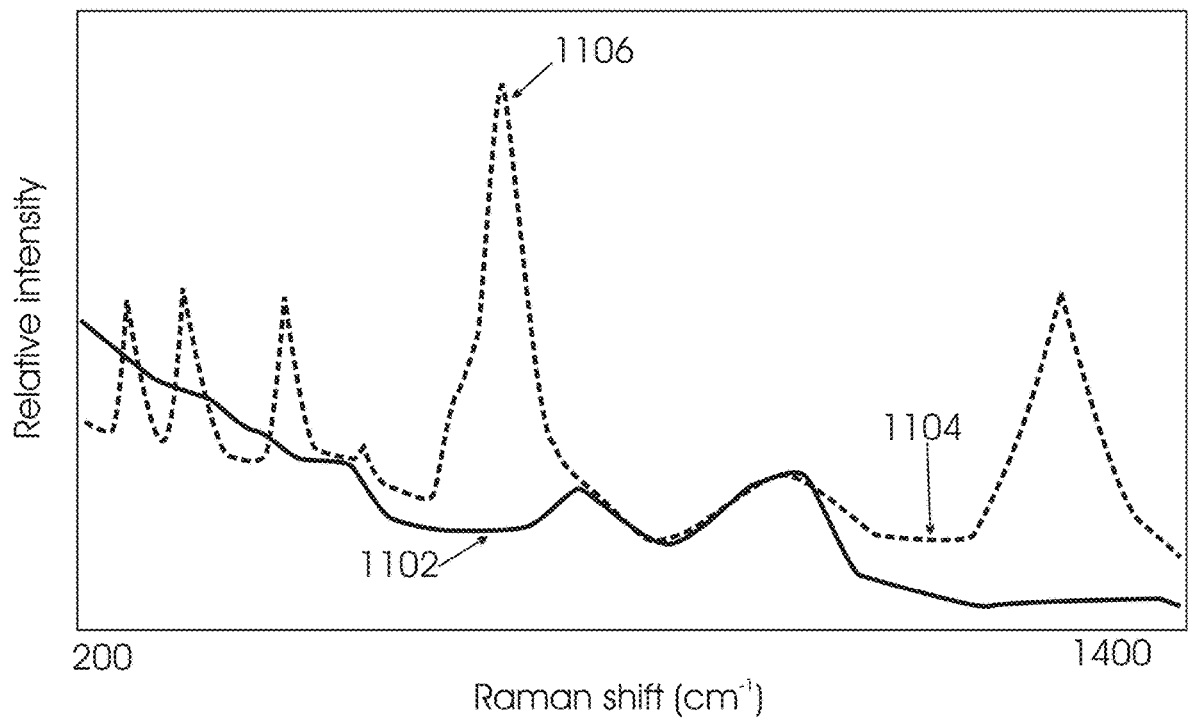
FIG. 11 shows Raman spectra for the surface of an as-purchased metal foil substrate and for the same substrate with a metal oxide in accordance with an embodiment.

Referring now to FIG. 11, Raman spectra are shown for the surface of a metal foil substrate before and after forming an oxide layer in accordance with an embodiment. The metal foil comprises a plurality of metals (i.e., an alloy). A very thin layer of native oxide may be present, but no significant oxide-related peaks are exhibited in the Raman spectrum 1102 of the as-purchased metal foil. By contrast, several oxide-related peaks can be seen in the Raman spectrum 1104 of the oxidized surface.

Generally, Raman spectroscopy shows vibrational modes in crystalline lattices as a wavelength shift due to inelastic scattering of photons from lattice vibrations (phonons). These lattice vibrations, in turn, have a characteristic frequency that can be associated with particular lattice structures, and the measured wavelength shift can be correlated with those characteristic frequencies and the corresponding lattice symmetry. Accordingly, Raman spectra peaks are often labeled with a lattice symmetry group. Of particular interest for carbon nanotube growth is the peak 1106 at about 680 $cm^{-1}$. Without being bound by theory, it is believed that this particular peak is associated with an $A_{1g}$ symmetry group (or "mode") which has been observed in the "spinel" phase of mixed oxides [see, for example, B. D. Hosterman, *Raman Spectroscopic Study of Solid Solution Spinel Oxides*, PhD Thesis, Univ. Nev., Las Vegas, 2011, incorporated herein by reference; see FIGS. 28 ($FeCr_2O_4$), 30 ($MgCr_2O_4$), 33 ($NiCr_2O_4$), and 34 ($NiFe_2O_4$)].

Spinel is a naturally occurring mineral. A typical "pure" composition is $MgAl_2O_4$, although mixed compositions such as $(Mg,Fe)(Al,Cr)_2O_4$ are common. In general, many mixed oxides of the form $M^1M^2{}_2O_4$ ($M^1$ and $M^2$ being different metals) may have a spinel phase. Spinets have a characteristic cubic or twinned octahedral crystal habit which exhibits the $A_{1g}$ symmetry group. As can be seen in FIG. 11, the spinel Raman peak 1106 at 680 $cm^{-1}$ is entirely absent in the as-purchased foil, and is prominent after oxidation of the metal substrate surface. The percentage of carbon nanotubes formed on the surface (relative to total carbon deposited including amorphous carbon) was found to be strongly correlated with the intensity of the 680 $cm^{-1}$ peak. This observation suggests that a mixed metal oxide that can form a spinel lattice favors the subsequent growth of carbon nanotubes.

The carbon nanotube structures described herein may be used in a wide variety of devices. The carbon nanotube structures can be used as electrodes for ultracapacitors, or lithium ion batteries. In addition the carbon nanotube structures can be used in methane and hydrogen storage, solar cells, electrocatalysts, and electrodes and catalysts supports for fuel cells, and porous carbon electrodes for lithium sulfur and lithium oxygen batteries. In addition, the carbon nanotube structures may be used in radio frequency shielding applications; as a thermal interface material; as a thermal management material; and as an absorber of electromagnetic radiation across a range of wavelengths including ultraviolet, visible, infrared, microwave, and radio-frequency wavelengths.

Ultracapacitors which include carbon nanotubes described herein may be used in a wide variety of applications, such as for example, electric transportation technology, (e.g., electric vehicles, electric hybrid vehicles, micro hybrids, catalytic converter preheater, etc.), electric utility industry (e.g., emergency backup power system, grid system stability improvement system, charging devices, smart grids, etc.), consumer electronics, (e.g., cellular telephones, cameras, computers, pagers, copy machines, amplifiers, etc.), medical electronics (e.g., defibrillators, drug delivery units, neurological stimulators, etc.), military devices (e.g., missiles, aerial vehicles, communication devices, etc.), etc. The above technologies can be used in conjunction with batteries (e.g., lithium, magnesium, aluminum, lead, mercury, iron, cadmium, nickel batteries, etc.).

Embodiments of the present disclosure thus offer advantages over the prior art and are well adapted to carry out one or more of the objects of the disclosure. However, each of the appended claims do not require each of the components and acts described above and is in no way limited to the above-described embodiments and methods of assembly and operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

The methods described above and which may be claimed herein and any other methods which may fall within the scope of the appended claims can be performed in any desired suitable order and are not necessarily limited to the sequence described herein or as may be listed in any appended claims. Further, the methods of the present disclosure do not necessarily require use of the particular embodiments shown and described in the present application, but are equally applicable with any other suitable structure, form and configuration of components.

While embodiments have been shown and described, many variations, modifications and/or changes of the system, apparatus and methods herein, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of this disclosure and scope of appended claims. Thus, all matter herein set forth or shown in the accompanying drawings should be interpreted as illustrative, and the scope of this disclosure and the appended claims should not be limited to the embodiments described and shown herein.

What is claimed is:

1. An ultracapacitor comprising one or more composite structures comprising a metal substrate having a thickness less than 500 um, the metal substrate further comprising:
   a metal oxide layer disposed over at least a majority of a first surface of the metal substrate, the average thickness of the metal oxide layer being less than 150 nm;
   the metal oxide layer being comprised of at least a first metal and a second metal, wherein the first metal and the second metal are different elements; and
   a plurality of carbon nanotubes disposed on a first surface the metal oxide layer, wherein at least a portion of the carbon nanotubes are disposed such that one end of the carbon nanotube is positioned at least 5 nm below the surface of the metal oxide layer, wherein the plurality of carbon nanotubes are comprised of carbon nanotubes having accessible nanopores having a characteristic dimension of less than about 2 nm and carbon nanotubes having accessible mesopores having a characteristic dimension between 2 nm and 50 nm;
   wherein the ultracapacitor further comprises an electrolytic membrane and an electrolyte comprising one or more ionic liquid electrolytes comprising a 1, 3 bisalkyl imidazolium salt or a N-alkylpyridinium salt.

2. The ultracapacitor of claim 1, wherein the metal oxide layer comprises a first layer comprising the first metal oxide and a second layer comprising the second metal oxide.

3. The ultracapacitor of claim 1, wherein the one or more composite structures are prepared by depositing the metal oxide layer onto the surface of the metal substrate.

4. The ultracapacitor of claim 1, wherein the first surface of the metal substrate has root mean square roughness of 100 nm or less.

5. The ultracapacitor of claim 1, wherein at least a first carbon nanotube is electrically coupled to the substrate.

6. The ultracapacitor of claim 5, wherein an electrical junction between the first carbon nanotube and the substrate is ohmic.

7. The ultracapacitor of claim 5, wherein an electrical junction between the first carbon nanotube and the substrate is non-ohmic.

8. The ultracapacitor of claim 5, wherein the metal oxide layer has a resistivity of less than $1 \times 10^{14}$ Ω-m.

9. The ultracapacitor of claim 8, wherein the second metal is selected from a first group of metals, and wherein the first group of metals consists of: iron, nickel, aluminum, cobalt, copper, chromium, and gold.

10. The ultracapacitor of claim 1, wherein the ratio of the first metal to the second metal in the oxide layer is at least 6:5.

11. The ultracapacitor of claim 1, wherein the first metal is selected from a first group of metals, the second metal is selected from the first group of metals; and the first group of metals consists of: iron, nickel, aluminum, cobalt, copper, chromium, and gold.

12. The ultracapacitor of claim 1, wherein the carbon nanotubes are disposed on the metal oxide, and wherein at least 50% of the carbon nanotubes are orthogonal to the first surface of the metal oxide.

13. The ultracapacitor of claim 1, wherein the carbon nanotubes are disposed on the metal oxide, and wherein at least 50% of the carbon nanotubes are non-orthogonal to the first surface of the metal oxide.

14. The ultracapacitor of claim 1, wherein the ultracapacitor is an electrochemical double layer capacitor.

15. The ultracapacitor of claim 14, wherein the ultracapacitor comprises two electrodes, wherein each electrode comprises carbon nanotubes, and wherein the electrodes are separated by the electrolytic membrane.

16. The ultracapacitor of claim 15, wherein the electrolytic membrane maintains electrical isolation of the two electrodes.

17. The ultracapacitor of claim 1, wherein the ultracapacitor further comprises a contact collector.

18. The ultracapacitor of claim 1, wherein the ultracapacitor further comprises one or more clamp assemblies such as one or more coin cells or one or more laminate cells.

19. The ultracapacitor of claim 1, wherein the ultracapacitor is a pseudo-capacitor, and wherein the carbon nanotubes are loaded with metal oxide particles.

20. The ultracapacitor of claim 1, wherein the ultracapacitor is an asymmetrical capacitor.

21. The ultracapacitor of claim 1, further comprising multiple pairs of stacked electrodes.

* * * * *